May 10, 1927.
W. C. WHITE
INDICATING APPARATUS
Filed Feb. 27, 1923
1,628,444
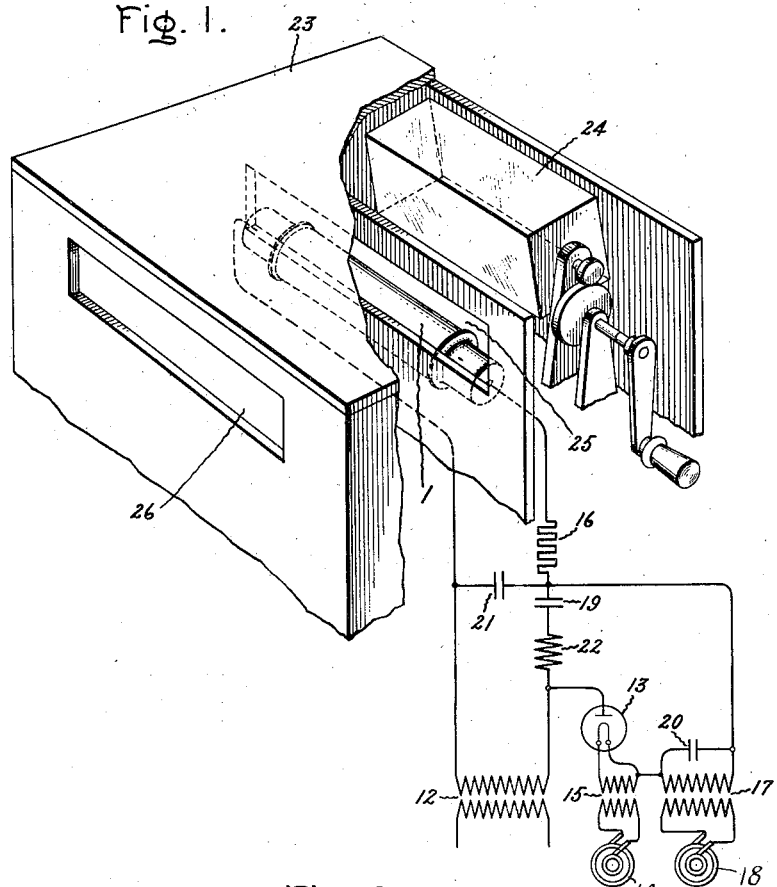
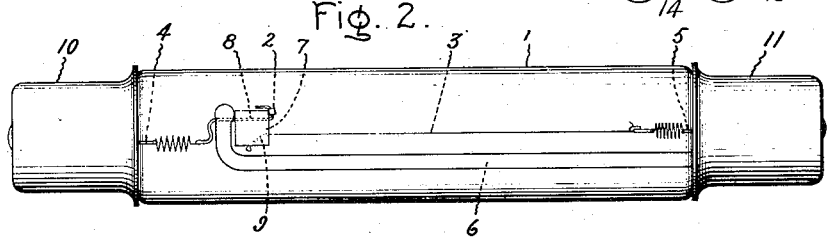
Inventor:
William C. White,
by *Alexander D. Lunt*
His Attorney.

Patented May 10, 1927.

1,628,444

UNITED STATES PATENT OFFICE.

WILLIAM C. WHITE, OF SCHENECTADY, NEW YORK, ASSIGNOR TO GENERAL ELECTRIC COMPANY, A CORPORATION OF NEW YORK.

INDICATING APPARATUS.

Application filed February 27, 1923. Serial No. 621,692.

My present invention relates to apparatus for producing an indication of electrical variations and more particularly to apparatus for producing a visible indication of electrical variations of too short duration to be directly observed in ordinary measuring instruments.

One of the objects of my invention is to provide a simple and efficient device for producing a visible indication of electrical variations. A more specific object of my invention is to provide a device which will be capable of giving an indication to the operator of a radio telephone transmitting station of the amount of modulation of the transmitted current which is being obtained.

In attaining the objects of my invention, I take advantage of the known phenomena as published by H. A. Wilson in Philosophical Magazine, vol. 4, 1902, that in a gas discharge tube having a fine wire for a cathode and a dissimilar electrode for an anode, if a certain gas pressure is maintained a luminous discharge will form around the wire cathode and the length of this discharge will be proportional to the current flowing. I therefore apply to such a device the current or electromotive force, of whose variations it is desired to obtain a visible indication. By this means it is possible to produce an easily visible glow discharge the actual length of which varies with variations in the potential by which the discharge is produced. To the unaided eye, however, the variations in length, unless they occur at comparatively long intervals will not be visible. If, however, the glow discharge is reflected upon a revolving mirror the variations in length of the discharge may readily be observed by watching the reflections in the mirror. It is therefore possible when a variable current such for example as a modulated high frequency current, is impressed upon the device, to produce a visible indication, whereby the operator can see at a glance the amount of percentage of modulation which is being obtained.

The novel features which I believe to be characteristic of my invention are set forth with particularity in the appended claims; my invention itself, however, both as to its organization and method of operation will best be understood by reference to the following description taken in connection with the accompanying drawing in which Fig. 1 is a partial perspective view of apparatus which may be used in carrying out my invention and a diagrammatic representation of a circuit connection which may be used therewith and Fig. 2 is an elevation of a discharge device which may be used in carrying my invention into effect.

As indicated in Fig. 2 I may employ a discharge device comprising a tubular evacuated receptacle 1 in which are enclosed electrodes 2 and 3, which are connected to leading-in conductors 4 and 5 extending into the tube from opposite ends. An arbor 6 which is supported from one end of the receptacle 1 serves to support the electrodes 2 and 3 and maintain them in proper spaced relation. This is accomplished by providing a block of insulating material 7 in which are inserted through suitable openings, conductor 8 which supplies current to electrode 2, and the free end 9 of electrode 3. The conductor 8 is also embedded in the arbor 6 and thereby serves to support the insulating block 7. It will be noted that by the construction described a discharge path is provided between electrodes 2 and 3 along one face of the insulating block 7. The electrode 3 is made preferably of a fine wire of tungsten extending linearly of the receptacle, as indicated, and the end of the electrode 3 is secured in the insulating block 7 so that the electrode 3 is of uniform cross-section along the entire length thereof, over which the glow discharge is produced. The electrode 2 may consist of a small piece of magnesium in order to lower the drop across the gap and make the voltage more uniform. When the electrode 3 is the cathode if a discharge is passed between the electrodes, a glow will be produced around the electrode 3, the length of which will vary in accordance with the current passing through the electrode 3. The receptacle 1 may be filled with argon or other suitable gas. The best pressure to use will depend upon the tube structure and somewhat upon the gas. If argon is used, satisfactory results may be obtained with pressures of 2 to 8 centimeters. In the tube illustrated in the drawing, a pressure of 5 centimeters of argon has been found satisfactory. Suitable terminals 10 and 11 may be provided on the ends of receptacles 1 for supplying current to the electrodes and for convenience in mounting.

In Fig. 1 I have indicated a circuit arrangement for supplying to the glow discharge device of Fig. 2 the current whose variations are indicated. This circuit arrangement comprises a transformer 12, to the primary of which, the variable current is supplied. Inasmuch as the desired glow is produced only when the electrode 3 is the cathode it is desirable to rectify the alternating current impressed upon the circuit in this way in order that the electromotive force impressed upon the device will always be in the right direction to produce the desired glow. An incandescent cathode rectifier 13, the cathode of which is supplied with heating current from an alternating source 14 through transformer 15, is therefore provided for rectifying the current to be impressed upon the discharge device. A resistance 16 should also be provided in series with the discharge device because of the fact that when the gap breaks down the resistance of the device is reduced to a very small value. The use of this resistance also gives equivalence between voltage applied to the circuit and length of glow. In a device such as I have described the gap breaks down to permit the formation of a discharge only at a certain predetermined value of voltage. If therefore the voltage available for producing an indication is less than this breakdown voltage no indication will be produced. For this reason I find it desirable to impress normally upon the discharge device an electromotive force of a value near that required to break down the gap between the electrodes. Such an electromotive force may be impressed upon the circuit by means of a transformer 17 supplied with current from an alternating current source 18.

A rectifier 13 serves to rectify the current impressed upon the circuit in this way and it thus supplies a substantially steady direct current potential to the circuit of the discharge device. The condenser 19 serves to smooth out fluctuations in this potential. A condenser 20 in shunt to the secondary of transformer 17 serves as a by-pass for the current variations which it is desired to indicate and when modulated radio frequency currents are supplied to the device a radio frequency by-pass condenser 21 may be employed. Radio frequency choke 22 may also be used in order that the radio frequency current supply shall be compelled to pass through the rectifier. In case the radio frequency employed is not too high and a well defined minimum length of glow is not important the apparatus may be used directly with alternating current without rectification.

By the apparatus thus far described a glow may be produced, the length of which along the electrode 3 will vary with the variations of electromotive force supplied to the exciting circuit. The variations in the length of this glow however, such as would be produced by modulated high frequency current would not be visible to the unaided eye. If, however, the discharge device is placed in a box 23, as indicated in Fig. 1, in such a way that the light from the glow may be reflected from a revolving mirror 24, through the openings 25 and 26, it will be possible to see with the eye the variations in the length of the glow in much the same manner as it is possible to observe fluctuations in current values with an ordinary oscillograph. It therefore will be possible to observe at a glance the percentage modulation which is being obtained in a radio telephone transmitting station; that is, if the loudest tones of a voice being transmitted are producing substantially 100% modulation, the length of the glow will vary between its maximum and substantially zero value. If only 50% modulation is being obtained the length of the glow will vary between a maximum and 50% of the average value.

The device which I have described is intended as a simple instrument for obtaining a quick and convenient indication of current conditions in an electric circuit. It is apparent, however, that by suitable modifications the indication obtained in the manner described may be photographed to form a permanent record for future study or analysis.

While I have shown and described the preferred embodiment of my invention, it will be apparent that many modifications in the form of the apparatus used and the circuit arrangements employed therefore may be made without departing from the scope of my invention as set forth in the appended claims.

What I claim as new and desire to secure by Letters Patent of the United States, is:—

1. An indicating apparatus comprising a discharge device having two electrodes between which a discharge may be passed, one of said electrodes being of filamentary form and extending linearly in said device, a circuit arrangement for impressing an electromotive force upon said device to produce a discharge between said electrodes, means for impressing a modulated high frequency current on said circuit arrangement, and means for producing a visible indication of the resulting variations in the length of a glow discharge formed along said filamentary electrode.

2. An indicating apparatus comprising a discharge device having two electrodes between which a discharge may be passed, one of said electrodes being of filamentary form and extending linearly in said device, a circuit arrangement for impressing an electromotive force upon said device to produce a discharge between said electrodes, means for impressing a modulated high frequency current on said circuit arrangement, said circuit arrangement including means for rectifying said modulated high frequency current, and means for producing a visible indication of the resulting variations in the length of a glow discharge formed along said filamentary electrode.

3. An indicating apparatus comprising a discharge device having two electrodes between which a discharge may be passed, one of said electrodes being of filamentary form and extending linearly in said device, means for impressing upon a circuit between said electrodes a steady electromotive force of a value near the breakdown electromotive force necessary to establish a discharge between said electrodes, means for superimposing upon said circuit a variable electromotive force and means for producing a visible indication of the resulting variations in the length of a glow discharge formed along said filamentary electrode.

4. An indicating apparatus comprising a discharge device having two electrodes between which a discharge may be passed, one of said electrodes being of filamentary form and extending linearly in said device, means for impressing upon a circuit between said electrodes a steady electromotive force of the value near the breakdown electromotive force necessary to establish a discharge between said electrodes, means for superimposing upon said circuit a modulated high frequency current, and means for producing a visible indication of the resulting variations in the length of a glow discharge formed along said filamentary electrode.

5. An indicating apparatus comprising a discharge device having two electrodes between which a discharge may be passed, one of said electrodes being of filamentary form and extending linearly in said device, means for impressing upon a circuit between said electrodes a steady electromotive force of a value near the breakdown electromotive force necessary to establish a discharge between said electrodes, means for superimposing upon said circuit a modulated high frequency current, means for rectifying the modulated high frequency current, and means for producing a visible indication of the resulting variations in the length of a glow discharge formed along said filamentary electrode.

In witness whereof, I have hereunto set my hand this 24th day of February, 1923.

WILLIAM C. WHITE.